US012601330B1

(12) United States Patent
Jorns et al.

(10) Patent No.: US 12,601,330 B1
(45) Date of Patent: Apr. 14, 2026

(54) TARGETED-CURRENT-DENSITY HALL THRUSTER

(71) Applicant: The Regents of the University of Michigan, Ann Arbor, MI (US)

(72) Inventors: Benjamin Jorns, Ann Arbor, MI (US); Eric Viges, Ann Arbor, MI (US); Madison Allen, Ann Arbor, MI (US); Thomas Marks, Ann Arbor, MI (US); Christopher Sercel, Ann Arbor, MI (US); William Hurley, Ann Arbor, MI (US); Parker Roberts, Ann Arbor, MI (US); Leanne Su, Ann Arbor, MI (US); Tate Gill, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 51 days.

(21) Appl. No.: 18/763,689

(22) Filed: Jul. 3, 2024

Related U.S. Application Data

(60) Provisional application No. 63/524,756, filed on Jul. 3, 2023.

(51) Int. Cl.
*F03H 1/00* (2006.01)
*B64G 1/40* (2006.01)

(52) U.S. Cl.
CPC .......... *F03H 1/0068* (2013.01); *B64G 1/413* (2023.08); *F03H 1/0037* (2013.01); *F03H 1/0081* (2013.01); *F03H 1/0093* (2013.01)

(58) Field of Classification Search
CPC .... F03H 1/0037; F03H 1/0093; F03H 1/0081; F03H 1/0068; B64G 1/405; B64G 1/413
See application file for complete search history.

(56) References Cited

U.S. PATENT DOCUMENTS

| | | | | |
|---|---|---|---|---|
| 4,577,461 A * | 3/1986 | Cann | ..................... | F03H 1/0068 |
| | | | | 219/121.49 |
| 8,587,227 B2 * | 11/2013 | Koch | ........................ | H05H 1/54 |
| | | | | 315/506 |
| 9,145,216 B2 * | 9/2015 | Gascon | ................. | F03H 1/0012 |
| 11,760,508 B2 * | 9/2023 | Keidar | .................... | B64G 1/10 |
| | | | | 244/171.1 |

OTHER PUBLICATIONS

Boeuf, J. P., Tutorial: Physics and modeling of Hall thrusters, J. Appl. Phys., vol. 121, No. 1, 2017, p. 011101.
Brown, D. L. et al., Methodology and Historical Perspective of a Hall Thruster Efficiency Analysis, J. Propul. Power, vol. 25, No. 6, 2009, pp. 1163-1177.
Bugrova, A. I. et al., Experimental investigations of a krypton stationary plasma thruster, Int. J. Aerosp. Eng., 2013, pp. 1-7.

(Continued)

*Primary Examiner* — Kyle Robert Thomas
(74) *Attorney, Agent, or Firm* — Lempia Summerfield Katz LLC

(57) ABSTRACT

A thruster includes a current loop, a magnetic circuit within the current loop, a channel, a propellant reservoir and an ejection outlet. The channel forms an ejection path from an output of the propellant reservoir to the ejection outlet. The current loop is driven by a tuned current density based on at least a selected propellant. The selected propellant is ejected down the channel due to an applied electric field.

20 Claims, 3 Drawing Sheets

100

110

199

Axis of Symmetry

Driver Circuitry
120

(56)     References Cited

OTHER PUBLICATIONS

Cusson, S. E. et al., Acceleration region dynamics in a magnetically shielded Hall thruster, Phys. Plasmas, vol. 26, No. 2, 2019, p. 023506.

Cusson, S. E. et al., Performance of the H9 Magnetically Shielded Hall Thrusters, 35th International Electric Propulsion Conference; 2017; pp. 1-22.

Dannenmayer, K. et al., Elementary scaling relations for hall effect thrusters, Journal of Propulsion and Power, vol. 27, No. 1, 2011, pp. 236-245.

Diamant, K. D. et al., The Effect of Background Pressure on SPT-100 Hall Thruster Performance, 50th AIAA/ASME/SAE/ASEE Joint Propulsion Conference; 2014; pp. 1-17.

Duchek, M. E. et al., Key Performance Parameters for MW-Class NEP Elements and their Interfaces, Ascend 2022, 2022, pp. 1-18.

Goebel, D. M. et al., Conducting wall hall thrusters, IEEE Transactions on Plasma Science, vol. 43, No. 1, 2015, pp. 118-126.

Goebel, D. M. et al., Fundamentals of Electric Propulsion: Ion and Hall Thrusters, Jet Propulsion Laboratory, California Institute of Technology; JPL Space Science & Technology Series; 2008; pp. 1-493.

Grimaud, L. et al., Conducting wall Hall thrusters in magnetic shielding and standard configurations, Journal of Applied Physics, vol. 122, No. 3, 2017, p. 033305.

Grishin, S. D. et al., Characteristics of a Two-Stage Ion Accelerator with an Anode Layer, Journal of Applied Mechanics and Technical Physics, vol. 19, 1978, pp. 166-173.

Hall, S. J. et al., Performance and high-speed characterization of a 100-kW nested Hall thruster, Journal of Propulsion and Power, vol. 38, No. 1, 2022, pp. 1-11.

Hofer, R. R. et al., Factors Affecting the Efficiency of Krypton Hall Thrusters, 46th Meeting of the APS Division of Plasma Physics; 2004; pp. 1-13.

Hofer, R. R. et al., High-specific impulse Hall thrusters, part 2: efficiency analysis, Journal of Propulsion and Power, vol. 22, No. 4, 2006, pp. 732-740.

Hofer, R. R. et al., Magnetic shielding of a laboratory Hall thruster. II. Experiments, J. Appl. Phys., vol. 115, No. 4, 2014, p. 043304.

Hofer, R. R. et al., Performance of a Conducting Wall, Magnetically Shielded Hall Thruster at 3000-s Specific Impulse, 37th International Electric Propulsion Conference; 2022; pp. 1-20.

Hofer, R. R. et al., The H9 Magnetically Shielded Hall Thruster, 35th International Electric Propulsion Conference; 2017; pp. 1-18.

Huang, W. et al., Facility Effect Characterization Test of NASA's HERMeS Hall Thruster, 52nd Joint Propulsion Conference; 2016; pp. 1-31.

Jacobson, D. T. et al., 50 kW Class Krypton Hall Thruster Performance, 39th Joint Propulsion Conference and Exhibit, NASA; 2003; pp. 1-15.

Jameson, K. K. et al., Cathode coupling in Hall thrusters, 30th International Electric Propulsion Conference, 2007, pp. 1-20.

Jankovsky, R. et al., High power Hall thrusters, 35th Joint Propulsion Conference and Exhibit, 1999, pp. 1-16.

Jorns, B. A. et al., Model for the dependence of cathode voltage in a Hall thruster on facility pressure, Plasma Sources Science and Technology, vol. 30, No. 1, 2021; pp. 1-18.

Jorns, B. A. et al., Prediction and Mitigation of the Mode Transition in a Magnetically Shielded Hall Thruster at High-Specific Impulse and Low Power, 37th International Electric Propulsion Conference; 2022; pp. 1-26.

Kamhawi, H. et al., Performance Characterization of the Air Force Transformational Satellite 12 kW Hall Thruster, Tech. rep., National Aeronautics and Space Administration; 2013; pp. 1-21.

Kamhawi, H. et al., Performance Evaluation of the NASA-300M 20 kW Hall Thruster, 47th Joint Propulsion Conference and Exhibit, American Institute of Aeronautics and Astronautics; 2011; pp. 1-9.

Karadag, B. et al., Thrust performance, propellant ionization, and thruster erosion of an external discharge plasma thruster, Journal of Applied Physics, vol. 123, No. 15, 2018, p. 153302.

Kim, V., Main physical features and processes determining the performance of stationary plasma thrusters, Journal of propulsion and power, vol. 14, No. 5, 1998, pp. 736-743.

Kurzyna, J. et al., Performance tests of IPPLM's krypton Hall thruster, Laser Part. Beams, vol. 36, No. 1, 2018, pp. 105-114.

Linnell, J. A. et al., Efficiency Analysis of a Hall Thruster Operating with Krypton and Xenon, Journal of Propulsion and Power; vol. 22, No. 6, 2006, pp. 1402-1412.

Manzella, D., Performance Evaluation of the SPT-140, National Aeronautics and Space Administration, Lewis Research Center, 1997; pp. 1-10.

Marchioni, F. et al., Extended channel Hall thruster for air-breathing electric propulsion, Journal of Applied Physics, vol. 130, No. 5, 2021, p. 053306.

Marrese, C. et al., An investigation of stationary plasma thruster performance with krypton propellant, 31st Joint Propulsion Conference and Exhibit, American Institute of Aeronautics and Astronautics, 1995; pp. 1-9.

Mason, L. et al., 1000 hours of testing on a 10 kilowatt Hall effect thruster, 37th Joint Propulsion Conference and Exhibit, 2001, pp. 1-8.

Mikellides, I. G. et al., Magnetic shielding of a laboratory Hall thruster. I. Theory and validation, J. Appl. Phys., vol. 115, No. 4, 2014, p. 043303.

Morozov, A. I. et al., Fundamentals of Stationary Plasma Thruster Theory, Reviews of Plasma Physics, vol. 21, 2000, pp. 203-391.

Next Space Technologies for Exploration Partnerships; Broad Agency Announcement NNH15ZCQ001K, Tech. rep., National Aeronautics and Space Administration, 2014; pp. 1-25.

Peterson, P. et al., The Performance and Wear Characterization of a High-Power High-Isp NASA Hall Thruster, 41st Joint Propulsion Conference and Exhibit, American Institute of Aeronautics and Astronautics; 2005; pp. 1-14.

Pote, B. et al., Performance of an 8 kW Hall thruster, Tech. rep., Busek CO. INC.; Natick MA, 2000; pp. 1-9.

Reid, B. M., The influence of neutral flow rate in the operation of Hall thrusters, Ph.D. thesis, University of Michigan, 2009; pp. 1-383.

Simmonds, J. et al., A Theoretical Thrust Density Limit for Hall Thrusters, Journal of Electric Propulsion, vol. 2; 2023; pp. 1-26.

Soulas, G. et al., Performance test results of the NASA-457M v2 Hall thruster, 48th AIAA/ASME/SAE/ASEE Joint Propulsion Conference & Exhibit, 2012, pp. 1-22.

Space Nuclear Propulsion for Human Mars Exploration; National Academies of Sciences, Engineering, and Medicine; The National Academies Press; 2021; pp. 1-93.

Su, L. et al., Performance comparison of a 9-kW magnetically shielded Hall thruster operating on xenon and krypton, Journal of Applied Physics, vol. 130, No. 16, 2021, p. 163306.

Su, L. L. et al., Performance at High Current Densities of a Magnetically-Shielded Hall Thruster, Propulsion and Energy Forum, American Institute of Aeronautics and Astronautics, 2021; pp. 1-22.

Szabo, J. et al., A commercial one Newton Hall effect thruster for high power in-space missions, 47th AIAA/ASME/ SAE/ASEE Joint Propulsion Conference & Exhibit, 2011; pp. 1-11.

Walker, M. L. R. et al., Overview of the Joint Advanced PropUlsion Institute (JANUS), 37th International Electric Propulsion Conference; 2022; pp. 1-19.

Williams, G. J. et al., Wear Trends of the HERMeS Thruster as a Function of Throttle Point, 35th International Electric Propulsion Conference, 2017; pp. 1-30.

* cited by examiner

200

Drive current in current paths in accord with a selected current density level for the selected propellant.     202

Feed propellant into channel.     204

Create electric field gradient via magnetic field created by the cycling current.     206

Eject ions form the channel.     208

TARGETED-CURRENT-DENSITY HALL THRUSTER

PRIORITY

This application claims priority to U.S. Provisional Patent Application No. 63/524,756, filed Jul. 3, 2023, and entitled TARGETED-CURRENT-DENSITY HALL THRUSTER, which is incorporated by reference herein in its entirety.

STATEMENT REGARDING FEDERALLY SPONSORED RESEARCH OR DEVELOPMENT

This invention was made with government support under 80NSSC21 K1118 awarded by the National Aeronautics and Space Administration. The government has certain rights in the invention.

BACKGROUND

Technical Field

The disclosure relates generally to Hall thrusters.

Brief Description of Related Technology

In space travel thruster systems are used to propel vehicles to target destinations. For interplanetary space travel, thruster efficiency may guide selection of systems. Longer distance missions pose the challenge that resources, including thruster propellants and thruster energy sources, used later in the mission often may be carried by the mission vehicle from the onset. Thus, increases in thruster efficiency and improvements in the operation of high efficiency thruster designs will continue to drive adoption.

DETAILED DESCRIPTION

Figure 1:
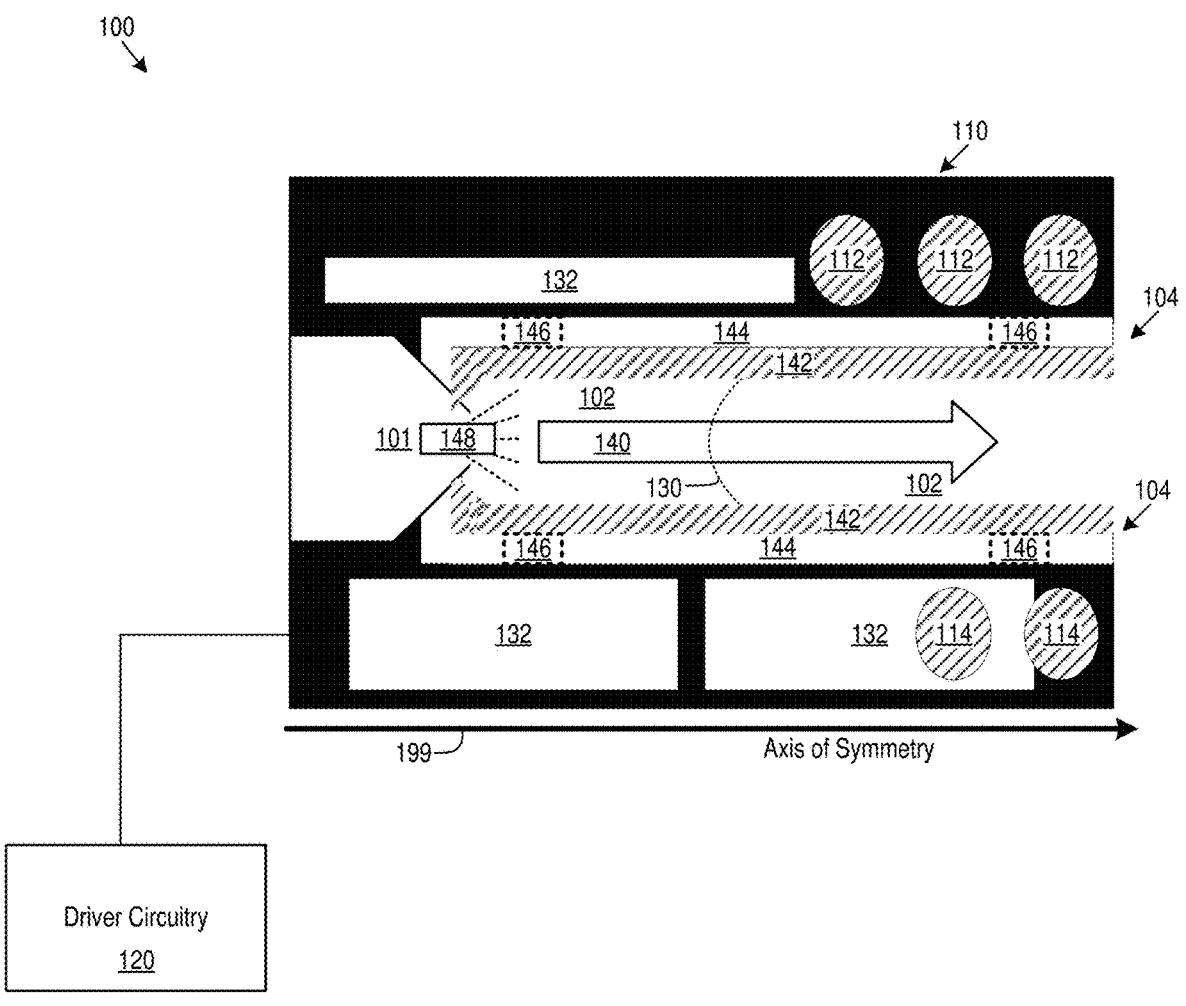
FIG. 1 shows a cross-sectional view of an example thruster.

In various contexts, a Hall thruster may generate propulsion by ejecting ions from a channel as a result of an electric field between anode and cathode a magnetic field created by operating magnetic circuits proximate the channel. The electric field may accelerate the ions. The magnetic field may inhibit the flow of electrons through a channel between a cathode and anode (e.g., outside and inside the channel, respectively). These electrons serve to ionize propellant and maintain neutrality of the propellant. In some cases, a fluid (such as a noble gas, gas, vaporized condensed matter (solid or liquid) or other fluid) supplied by a mass source of the thruster may be used as a source of electrons and/or ions. The ions produced by ionization are accelerated by the applied electric field out of the geometry.

As operating power increases, strain on the system may increase. For example, accelerated ions may crash into the various surfaces of the channel and/or other portions of the thruster. Accordingly, the accelerated ions may cause erosion on these surfaces. For example, increased operation power may be associated with increased current and/or current density. Increases in current and/or current density may increase heating due to resistance in the conductive materials (such as copper, noble metals, high temperature superconductors, and/or other high conductivity materials) used to create the magnetic circuits proximate the channel in which the ions are accelerated. Increases in current density may lead to higher flux to the thruster components, also leading to increased heating in these materials.

In some cases, thruster efficiency may rise with increasing current density reaching a peak range and/or value and then fall with increasing current density beyond the peak. In some cases, the current density level at which the peak occurs may depend on the particular propellant used in the thruster. According to the conventional wisdom, xenon is a preferable propellant because of xenon's high ionization radius. Thus, xenon ionizes with less power input than other propellants and is thought to offer greater efficiency than competing propellants due to low ionization power requirement. Consistent with the conventional wisdom, xenon outperforms many competing propellants in, for an example thruster at various operating currents below 50 A. In an example thruster using xenon gas as a propellant, the peak efficiency may occur at a current of about 50 A (for the example thruster thus 50 A corresponds to a specific current density). For example, the operating current of 50 A corresponds to a current density of 500 mA/cm$^2$.

Unexpectedly, at various operating currents above 50 A various other propellants may operate at higher efficiency for the example thruster. Other propellants, such as krypton as an illustrative example, may have a smaller ionization radius than xenon. Despite the smaller ionization radius of these materials, the operation efficiency of the thruster may exceed that of xenon because the smaller ionization radius of the materials shifts that peak operational efficiency to a higher current density. Unexpectedly, this shift of the efficiency peak can be large enough for some materials that the decreasing efficiency for xenon in this range dips below the peak efficiency for selected competing propellants with smaller ionization radii. For example, targeted current densities up to 1000 mA/cm$_2$ have been shown herein in materials such as krypton, argon, nitrogen, air, carbon dioxide, bismuth and/or other materials with smaller ionization radii than xenon. Moreover, targeted current density ranges exceeding 1000 mA/cm$^2$, e.g., up to 3000 mA/cm$^2$ or more may be implemented using such materials.

The various ones of the techniques and architectures discussed herein proceed contrary to conventional wisdom in that they select propellants with smaller ionization radii to increase operational efficiency whereas the conventional wisdom provides that larger ionization radii increases efficiency. Moreover, techniques and architectures discussed herein proceed contrary to conventional wisdom in that target operating current density and selected propellant may be chosen as a tuple (e.g., a pair). Thus, a material for the propellant may be selected to such that an efficiency peak or other comparatively high efficiency operation point is near the desired operating current density of the thruster instead of selecting a particular propellant and desired operating current density separately. Thus, various implementations discussed herein may support multiple different propellants to facilitate selection of a particular propellant to match a desired operating current density for the thruster.

Additionally or alternatively, various implementations may use conductive materials in the construction of the channel wall. In some cases, conductive materials may allow an electrical pathway to form across plasma within the channel and the current loop that accelerates the propellants may be shorted during operation. Accordingly, electrical isolation between the current magnetic circuits of the thruster and the channel walls may be added. However adding electrical insulation may increase the mass of the thruster. Conversely, according to the conventional wisdom an air gap (or other insulating void) isolating the whole of the channel wall will not provide physical rigidity to maintain the electrical separation and/or physical integrity of the thruster.

Various one of the techniques and architectures discussed herein proceed contrary to conventional wisdom in that they use an air gap to provide electrical isolation for the conducting material of the channel wall. Ceramic spacers may be used within the air gap to provide physical rigidity while maintaining the isolation (which may be both thermal and electrical) of the air gap. Moreover, the ceramic spacers may provide suitable rigidity using less mass than that of a complete layer of insulation.

FIG. 1 shows a cross-sectional view of an example thruster 100. The cross-sectional view is along a radius of the thruster in a cylindrical space. The structure of the thruster may be realized by revolving the cross-section around the symmetry axis 199. Thus, the components (including the channel 102 and current paths 112, 114) shown via cross-section in FIG. 1 are annular in three dimensional space. The driver circuitry 120 is shown schematically as a block and is not intended to convey an annular geometry.

Current may be driven by driver circuitry 120 through multiple current paths 112, 114 (e.g., made from conductive materials such as copper, noble metals, high temperature superconductors, and/or other conductive materials) forming magnetic circuits around the channel. The current levels in the multiple current paths 112, 114 may be different, such that the spatial distribution of current cycling (e.g., for operation of the magnetic circuits) proximate the channel 102 may be controlled via control of the driver circuitry 120. The positions of the current paths may be selected (e.g., selectable through fixation at the time of fabrication of the thruster and/or selectable through mechanical translation during operation/configuration) to control the distribution. Accordingly, the spatial configuration of current paths shown in the example thruster is for the purpose of illustration and other spatial configurations may be used. The cross-sectional shape of the current paths may be selected to control the distribution. Accordingly, the cross-sectional shape shown is for the purpose of illustration and other shapes may be used. The number current paths may be selected to control the distribution. Accordingly, the number of current paths shown is for the purpose of illustration and other numbers of paths may be used. For example, up to 100 or more current paths may be used.

The current density level created in the channel by operation of the paths may be selected based on the propellant used. For example, the driver circuitry 120 may be specifically configured to provide current density levels for a pre-determined propellant based on an efficiency peak (or other selected range for the propellant) of that pre-determined propellant. For example, the driver circuitry 120 may be configured to operate in a selected mode from among multiple operating modes each associated with a specific selected propellant (or group of propellants). The selected mode may be configured to operate within at an efficiency peak and/or within other selected ranges for the propellant and/or group of propellants.

The spatial distribution of the magnetic field generated by the magnetic circuits may be selected to match (e.g., approximate to allow for operational performance interchangeable with) an existing thruster design reliant on a ferromagnetic core while implementing one or more air core (or other void) type core portions 132 in place of the ferromagnetic core. Accordingly a void-based thruster may be interchanged with a thruster using the ferromagnetic core reliant design and provide consistent thrust at a lower overall thruster weight. Accordingly, the current distribution in the current paths may be selected to create a similar magnetic field within the channel that would have been created using the ferromagnetic core. Additionally or alternatively, various permanent magnets may be used as cores.

In some cases, the magnetic circuit distribution may be selected to create magnetic shielding geometry in the channel. For example, the magnetic field in the channel may be selected to be strongest at the center of the channel and weakest near the wall of the channel. This shield geometry may reduce the intensity of collisions between ions and the channel wall, which may reduce material erosion and increase thruster performance/life.

The current levels in the multiple current paths may be independent from one another or dependent on one another.

For example, two current paths may have two independent current levels that may be selected via control of the driver circuitry 120 without affecting one another (in some cases, the two paths may be incidentally selected to be set to the same current level).

For example, two dependent current paths may be selected to have a defined relationship between their current levels. For example, the current paths may be selected to be fixed to have the same current level. For example, the current paths may be selected to have currents in a defined ratio (or other algorithmic relationship). For example, the current paths may be selected to have current levels within a defined range of one another. Other relationships may be used. These example current levels may be characterized as dependent.

The thruster 100 may include a chassis 110 that may house the current paths 112, 114. The chassis may include core portions 132 which may be 'air cores,' magnetic cores and/or other core materials. The core portions 132 may include portions of vacuum, gas, and/or other occupancy. The chassis 110 may be sealed or permeable. Accordingly, a gas/fluid content of the core portions 132 may be fixed at the time of fabrication of the thruster or allowed to change with changes in ambient environment. Solid material core portions may be used. Accordingly, the composition of the core portions may be fixed even if not first sealed in a particular ambient environment. The core portions 132 may allow for selectability of spacing between current paths for control of the distribution of the magnetic circuits.

In some implementations, inner magnetic circuits 114 (e.g., magnetic circuits surrounded by the annular channel 102) may be disposed within air core type core portions 132. Accordingly, the channel 102 may be disposed between the inner 114 and outer 112 magnetic circuits.

The channel 102 may further include a channel wall 142 that optionally may be electrically isolated from the chassis 110 via an air gap 144. The air gap 144 may be physically supported using optional ceramic spacers 146 or other non-conducting materials.

In some implementations, the channel wall 142 may include electrically conductive materials. For example, a graphite layer and/or coating may be used for the channel wall 142. In some cases, an electrically conductive channel wall may allow for electrical conduction across the plasma formed by the propellant. In some cases such electrical conduction across the plasma may cause a failure of the thruster. Accordingly, an electrically conductive channel wall may be paired with an electrically insulating layer outside the wall to frustrate such electrical conduction across the plasma. For example, the electrically conductive channel wall may be surrounded by an air gap (as discussed above). In some cases, a heat shield, such as a multi-layer insulation based heat shield surrounding the channel 102, may provide an electrically insulating layer.

Figure 2:
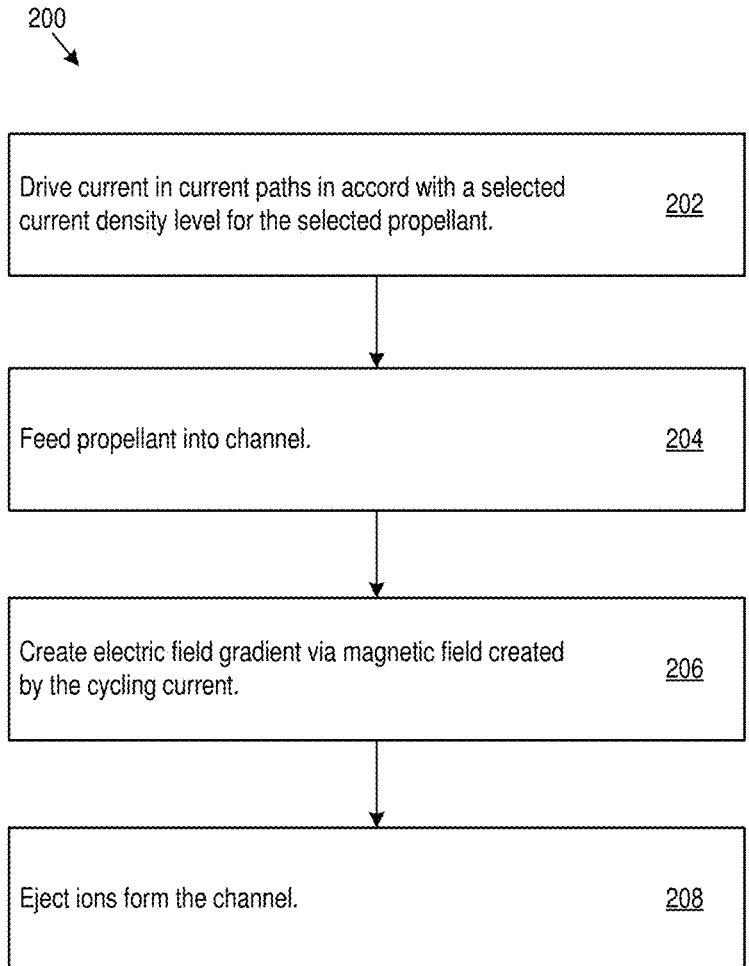
FIG. 2 shows an example thrust generation technique.

Referring now to FIG. 2 which shows example logic 200 for generation of thrust while continuing to refer to FIG. 1, the driver circuitry 120 may drive current in current paths 112, 114 to generate a magnetic field 130 in the channel 102 (202).

The current density level may be selected based on the propellant selected for operation. For example, the propellant may have an associated peak efficiency operational current density value and/or range associated with the particular architecture of a given thruster. In some cases, the operational efficiency profile may have a range of values over which efficiency varies by (at most) a specific percentage (e.g., 1%, 5%, 10%, or other specific percentage) such a thruster-efficiency plateau may define an operational range for a particular propellant and/or group of propellants. In various implementations, such peak efficiency modes may be one of multiple modes of operation of the thruster logic 200. For example, a peak operation current density level mode may be selected to be a high efficiency mode, such that the thruster operates at high efficiency when output of the thruster is at a peak. Accordingly, lower power modes may operate at a lower efficiency. In some cases, peak efficiency may be paired to a "most used" output level, such that peak efficiency coincides with the operational mode most used during operation of the thruster. In some cases, multiple different mass sources 101 with different propellants may feed the same thruster. The thruster may have different operating modes and the propellant paired the mode being used at the specific time is fed into the channel 102.

The selected propellant may include propellants such as gas/condensed matter vapor (e.g. xenon, krypton, argon, nitrogen, bismuth, or other gas or vaporized propellants). The logic 200 may cause the mass source to feed the propellant into the channel (204). Pressure differentials and/or other feed techniques may be used to achieve transport of the propellant from the mass source 101 into the channel 102. In various implementations, the mass source 101 may include a material reservoir to hold a quantity of the propellant. The material reservoir may be configured to hold a specific propellant and/or multiple different propellants.

The logic 200 may cause generation of the magnetic field 130 to inhibit the movement of electrons in the channel to collide with the accelerating propellant generating ions (206). The ionized electrons may increase and spiral in the channel. The increasing electrons combined with the applied electric potential from cathode to anode in the channel 102 may create an electric field gradient 140 along the channel 102 along an ejection path towards an ejection outlet 104 of the channel 102. The ionization process may be mediated by the ionization radius of the propellant. A propellant with a smaller ionization radius will tend to have a peak efficiency at a higher current density level. Conversely, a propellant with a larger ionization radius will tend to have a peak efficiency at a lower current density level. Accordingly, the current density level for a selected propellant may be selected (at least in part) based on the ionization radius of that propellant.

The channel 102 may include an anode 148 at the end of the ejection path with the mass source 101. The anode may form one end of a current "loop" in which ions are ejected out of the thruster through the channel 102. In various implementations, the anode may be constructed from an electrically-conductive material, such as, a metal, semimetal, graphite, stainless steel, iron, titanium, and/or other conductive materials. Additionally or alternatively, the material of the anode may be selected based on thermal robustness (e.g., for high-heat load thruster channel designs, such as thermally-isolated channels). For example, a graphite anode, titanium anode, and/or other thermally-robust anode may be selected.

In some implementations, the topology of the magnetic field 130 may be selected to implement magnetic shielding for the channel wall 142. For example, the electric field gradient 140 may be selected to be lower near the channel wall 142 than near the center of the channel. Thus, a layer of "cold" electrons forms near to the channel wall 142, which leads to an isopotential field line and an electric field directed away from the wall, inhibiting the motion of ions headed toward the channel wall 142. The magnetic circuits (both inner 114 and/or outer 112) may be driven by the driver circuitry 120 to generate the selected topology.

The electric field gradient 140 ejects the ions from the channel 102 via the ejection outlet 104 (208) causing thrust.

Figure 3:
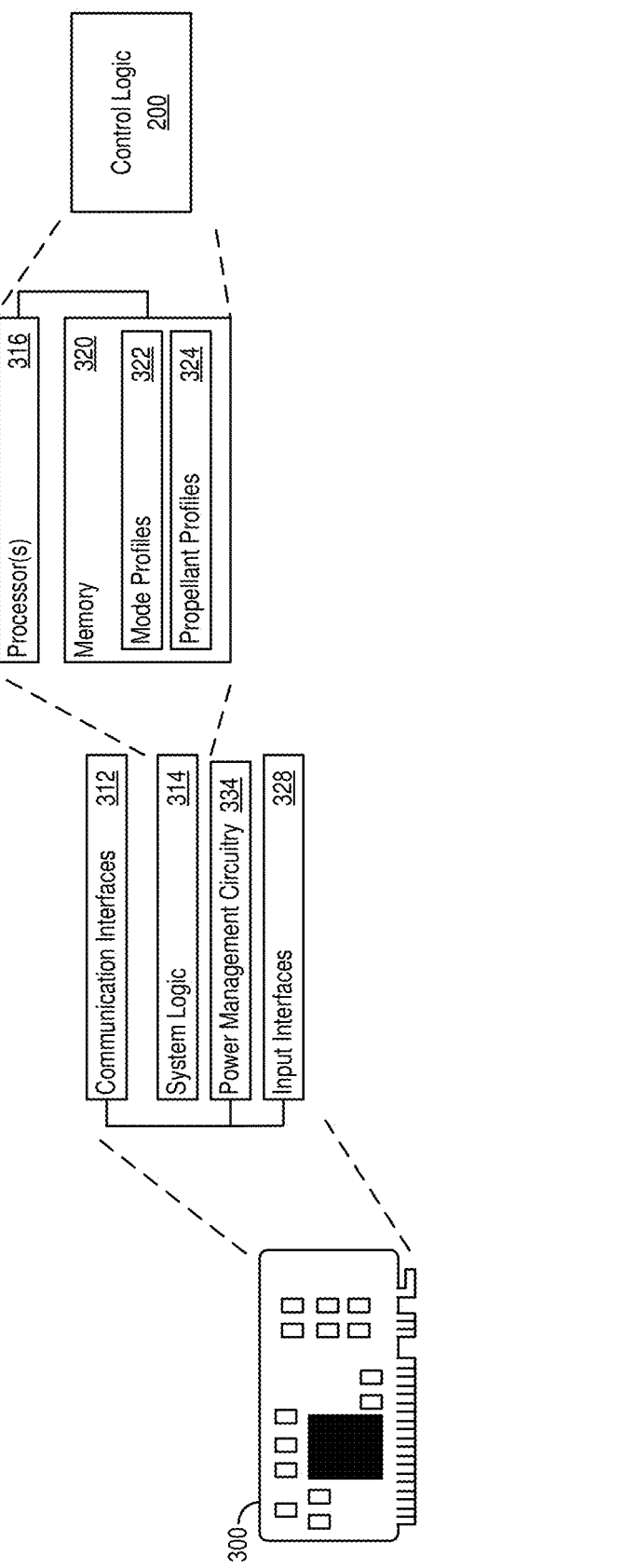
FIG. 3 shows an example propulsion control environment.

FIG. 3 shows an example propulsion control environment (PCE) 300, which may provide a hardware environment for execution of the logic 200. The PCE 300 may include system logic 314 to support propellant-specific thruster operation. The system logic 314 may include processors 316, memory 320, and/or other circuitry, which may be used to implement the example logic 200.

The memory 320 may be used to store operational mode profiles 322 (e.g., that detail current density outputs or selectable operational modes) and/or propellant profiles 324 (e.g., that detail a modes selection and/or other parameters for operation associated with a specific propellant).

The memory 320 may further include applications and structures, for example, coded objects, templates, or one or more other data structures to support iterative search operations. The PCE 300 may also include one or more communication interfaces 312, which may support internal bus communications, radio communications, and/or other communication pathways to receive propellant selections, mode commands, and/or other operational input. The PCE 300 may include power management circuitry 334 and one or more input interfaces 328.

Various implementations have been shown, various other implementations are possible.

Table 1 shows various examples.

TABLE 1

Examples

1. A thruster including:
an ejection outlet;
a material reservoir configured to hold multiple propellant alternatives;
a channel forming an ejection path from an output of the material reservoir to the
    ejection outlet;

TABLE 1-continued

Examples a current loop through the channel along the ejection path;
current and voltage tuning circuitry configured to drive the current loop through the
    channel at a tuned current density based on at least a selected one of the multiple
    propellant alternatives; and
a magnetic circuit, where:
optionally, the thruster is in accord with any other example in this table.
2. The thruster of any of the other examples in this table, where the magnetic
circuit includes an air core and/or a magnetic core surrounded by the channel.
3. The thruster of any of the other examples in this table, where the channel
includes an electrically conductive channel wall.
4. The thruster of example 3 or any of the other examples in this table, where the
electrically conductive channel wall includes a graphite channel wall.
5. The thruster of example 3 or any of the other examples in this table, where the
electrically conductive channel wall is electrically isolated from the magnetic circuit
via an air gap.
6. The thruster of example 5 or any of the other examples in this table, where the
air gap is structurally maintained via one or more spacers.
7. The thruster of example 6 or any of the other examples in this table, where the
one or more spacers include ceramic spacers.
8. The thruster of any of the other examples in this table, where the selected
propellant includes krypton, nitrogen, argon, carbon dioxide, air, water vapor, metal,
and/or combustion products of hydrocarbon fuels.
9. The thruster of any of the other examples in this table, where the current and
voltage tuning circuitry is configured to drive the current loop at a tuned current
density to place the tuned current density within a predefined range associated with
the selected propellant.
10. The thruster of example 9 or any of the other examples in this table, where the
predefined range includes a thruster-efficiency plateau range associated with the
selected propellant.
11. The thruster of any of the other examples in this table, where the tuned current
density is selected based on an ionization radius of the selected propellant.
12. A thruster including:
an ejection outlet;
a magnetic circuit;
a material reservoir configured to hold at least a selected propellant;
a channel forming an ejection path from an output of the material reservoir to the
    ejection outlet;
a current loop along the ejection path; and
current tuning circuitry configured to drive the current loop at a tuned current density
    based on at least the selected propellant, where:
optionally, the thruster is in accord with any other example in this table.
13. The thruster of any of the other examples in this table, where the selected
propellant includes krypton, nitrogen, and/or argon.
14. The thruster of any of the other examples in this table, further including an
electrically conductive channel wall, the electrically conductive channel wall being
electrically isolated from the magnetic circuit via an air gap.
15. The thruster of example 14 or any of the other examples in this table, where
the air gap is structurally maintained via one or more spacers.
16. The thruster of example 15 or any of the other examples in this table, where
the one or more spacers include ceramic spacers.
17. A method including:
driving a current loop at a tuned current density based on at least a selected
    propellant; and
ejecting, using an electric field from the current loop and a magnetic field generated
    via a magnetic circuit, the selected propellant down a channel forming an ejection
    path from an output of a propellant reservoir to an ejection outlet, where:
optionally, the method is in accord with any other example in this table and/or
    implemented using any thruster of any example of this table.
18. The method of any of the other examples in this table, where driving the
current loop at a tuned current to place the tuned current density within a predefined
range associated with the selected propellant.
19. The method of example 18 or any of the other examples in this table, where
the predefined range includes a thruster-efficiency plateau range associated with
the selected propellant.
20. The method of any of the other examples in this table, where the tuned current
density is selected based on an ionization radius of the selected propellant.
21. A thruster including:
an ejection outlet;
a magnetic circuit;
a mass source;
a channel forming an ejection path from an output of the mass source to the ejection
    outlet;
a channel wall surrounding the channel; and
an air gap surrounding the channel wall to electrically isolate the channel from at least
    the magnetic circuit; and
one or more spacers disposed within the air gap to maintain a spacing of the air gap.
22. The method of any of the other examples in this table, further including TABLE 1-continued Examples implementing any of the features of a thruster of any of the other examples in this table.
23. A method including implementing any feature or any group of features from the disclosure.
24. A thruster configured to implement any feature or any group of features from the disclosure.
25. Circuitry configured to implement logic to control operation of the thruster of any of the other example in this table.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A thruster including:
an ejection outlet;
a material reservoir configured to hold multiple propellant alternatives;
a channel forming an ejection path from an output of the material reservoir to the ejection outlet;
a current loop through the channel along the ejection path;
current and voltage tuning circuitry configured to drive the current loop through the channel at a tuned current density based on at least a selected one of the multiple propellant alternatives to place the tuned current density within a predefined range associated with the selected one of the multiple propellant alternatives; and
a processor configured to cause the current tuning circuitry configured to place the tuned current density within a predefined range associated with the selected one of the multiple propellant alternatives; and
a magnetic circuit.

2. The thruster of claim 1, where the magnetic circuit includes an air core and/or a magnetic core surrounded by the channel.

3. The thruster of claim 1, where the channel includes an electrically conductive channel wall.

4. The thruster of claim 3, where the electrically conductive channel wall includes a graphite channel wall.

5. The thruster of claim 3, where the electrically conductive channel wall is electrically isolated from the magnetic circuit via an air gap.

6. The thruster of claim 5, where the air gap is structurally maintained via one or more spacers.

7. The thruster of claim 6, where the one or more spacers include ceramic spacers.

8. The thruster of claim 1, where the multiple propellant alternatives include krypton, nitrogen, argon, carbon dioxide, air, water vapor, metal, and/or combustion products of hydrocarbon fuels.

9. The thruster of claim 1, where the predefined range includes a thruster-efficiency plateau range associated with the selected one of the multiple propellant alternatives.

10. The thruster of claim 1, where the tuned current density is selected based on an ionization cross-section of the selected one of the multiple propellant alternatives.

11. A thruster including:
an ejection outlet;
a magnetic circuit;
a material reservoir configured to hold at least a selected propellant of multiple propellant alternatives;
a channel forming an ejection path from an output of the material reservoir to the ejection outlet;
a current loop along the ejection path; and
current tuning circuitry configured to drive the current loop at a tuned current density based on at least an ionization cross-section of the selected propellant; and
a processor configured to cause the current tuning circuitry to tune the current density based on at least an ionization cross-section of the selected propellant.

12. The thruster of claim 11, where the selected propellant includes krypton, nitrogen, and/or argon.

13. The thruster of claim 11, further including an electrically conductive channel wall, the electrically conductive channel wall being electrically isolated from the magnetic circuit via an air gap.

14. The thruster of claim 13, where the air gap is structurally maintained via one or more spacers.

15. The thruster of claim 14, where the one or more spacers include ceramic spacers.

16. A method including:
obtaining, from a material reservoir configured to hold at least a selected propellant of multiple propellant alternatives, the selected propellant of the multiple propellant alternatives;
driving a current loop at a tuned current density based on at least a selected propellant of the multiple propellant alternatives to place the tuned current density within a predefined range associated with the selected propellant of the multiple propellant alternatives; and
ejecting, using an electric field generated via the current loop and a magnetic field from a magnetic circuit, the selected propellant of the multiple propellant alternatives down a channel forming an ejection path from an output of a propellant reservoir to an ejection outlet.

17. The method of claim 16, where the predefined range includes a thruster-efficiency plateau range associated with the selected propellant.

18. The method of claim 16, where the tuned current density is selected based on an ionization cross-section of the selected propellant.

19. The method of claim 16, where the magnetic circuit includes an air core and/or a magnetic core surrounded by the channel.

20. The method of claim 16, where the selected propellant includes krypton, nitrogen, and/or argon.

* * * * *